(12) United States Patent
Osawa et al.

(10) Patent No.: US 9,533,363 B2
(45) Date of Patent: Jan. 3, 2017

(54) INDEXABLE THREAD FORMING TAP

(75) Inventors: Jiro Osawa, Toyokawa (JP); Takayuki Matsushita, Toyokawa (JP); Kentaro Norimatsu, Toyokawa (JP); Tasuku Itoh, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 0 days.

(21) Appl. No.: 14/401,678

(22) PCT Filed: Jun. 6, 2012

(86) PCT No.: PCT/JP2012/064598
§ 371 (c)(1),
(2), (4) Date: Nov. 17, 2014

(87) PCT Pub. No.: WO2013/183134
PCT Pub. Date: Dec. 12, 2013

(65) Prior Publication Data
US 2015/0133226 A1    May 14, 2015

(51) Int. Cl.
*B23G 1/04* (2006.01)
*B23B 31/11* (2006.01)
(Continued)

(52) U.S. Cl.
CPC ............... *B23G 1/04* (2013.01); *B23B 31/005* (2013.01); *B23B 31/11* (2013.01); *B23G 7/02* (2013.01);
(Continued)

(58) Field of Classification Search
CPC ......... B23G 5/06; B23G 2200/02; B23G 7/02; B23G 1/04; Y10T 403/68; B22F 5/06
(Continued)

(56) References Cited

U.S. PATENT DOCUMENTS 1,407,335 A    2/1922   Reynolds et al.
5,060,740 A *  10/1991  Yousef ................ E21B 17/0426
                                                          175/415

(Continued)

FOREIGN PATENT DOCUMENTS

CN          85201412 U    6/1986
CN         201089049 Y    7/2008
(Continued)

OTHER PUBLICATIONS

English Translation of JP 5279541 (Equivilent to JP 2010184339).*
(Continued)

*Primary Examiner* — Shelley Self
*Assistant Examiner* — Patrick Gunson
(74) *Attorney, Agent, or Firm* — Oliff PLC (57) ABSTRACT

An indexable thread forming tap including: a body in a shaft shape; and a tip concentrically and detachably attached to a leading end portion of the body by screw-fastening and rotationally driven around an axial center along with the body for rolling of a female thread, the body being disposed with a screw hole concentrically to the axial center such that a screw shaft disposed on the tip concentrically to the axial center is screwed into the screw hole for the screw-fastening, a leading end surface of the screw shaft being pressed against a bottom surface of the screw hole into close contact with each other by the screw-fastening to integrally fix the tip to the body without the leading end of the body abutting on the tip, the body being disposed with a restraining hole concentrically to the axial center.

4 Claims, 11 Drawing Sheets

(51) Int. Cl.
    *B23G 7/02* (2006.01)
    *B23B 31/00* (2006.01)
(52) U.S. Cl.
    CPC .... *B23B 2260/1388* (2013.01); *B23G 2200/02* (2013.01); *B23G 2210/04* (2013.01); *B23G 2225/28* (2013.01); *B23G 2240/12* (2013.01)
(58) Field of Classification Search
    USPC .......... 470/198, 199, 84, 204; 411/380, 382, 411/384, 386, 387.4, 396, 398, 411, 414, 424
    See application file for complete search history.

(56) References Cited

U.S. PATENT DOCUMENTS

| | | | |
|---|---|---|---|
| 5,114,286 | A | 5/1992 | Calkins |
| 5,496,137 | A * | 3/1996 | Ochayon ................ B22F 5/06 408/226 |
| 5,971,670 | A | 10/1999 | Pantzar et al. |
| 6,497,540 | B1 | 12/2002 | Shikata et al. |
| 7,374,376 | B2 * | 5/2008 | Jonsson .............. B23B 31/1107 279/8 |
| 8,931,983 | B2 * | 1/2015 | Sharivker ............... B23B 31/11 408/143 |
| 2001/0041089 | A1 | 11/2001 | Hecht |
| 2004/0033113 | A1 | 2/2004 | Blomberg et al. |
| 2004/0185948 | A1 | 9/2004 | Muller |
| 2007/0207865 | A1 | 9/2007 | Glimpel et al. |
| 2010/0189523 | A1 | 7/2010 | Nonaka et al. |
| 2011/0170980 | A1 * | 7/2011 | McGrade ................ F16B 19/00 411/338 |
| 2011/0201434 | A1 | 8/2011 | Edelmann |
| 2012/0093602 | A1 | 4/2012 | Osawa et al. |
| 2014/0360334 | A1 | 12/2014 | Singer-Schnoeller |
| 2015/0063928 | A1 | 3/2015 | Maeda et al. |
| 2015/0078840 | A1 | 3/2015 | Pfeuffer |

FOREIGN PATENT DOCUMENTS

| | | |
|---|---|---|
| CN | 202123294 U | 1/2012 |
| DE | 102006010651 A1 | 9/2007 |
| FR | 2 787 048 A1 | 6/2000 |
| JP | A-10-504767 | 5/1998 |
| JP | H1-285912 A | 10/1999 |
| JP | B2-4117131 | 7/2008 |
| JP | 2010-184339 A | 8/2010 |
| JP | 2010184339 A * | 8/2010 |
| JP | A-2010-184339 | 8/2010 |
| WO | 2010/047158 A1 | 4/2010 |

OTHER PUBLICATIONS

International Search Report issued in International Application No. PCT/JP2012/064598 mailed Jul. 3, 2012.
Nov. 2, 2015 Office Action issued in Chinese Patent Application No. 201280073754.9.
Jan. 8, 2016 Search Report issued in European Patent Application No. 12878634.0.

* cited by examiner

| | BREAKAGE TORQUE (N·m) | | | SAFETY FACTOR | RATIO (%) |
|---|---|---|---|---|---|
| | No1 | No2 | AVERAGE | | |
| CONVENTIONAL PRODUCT | 84.75 | 97.81 | 91.28 | 2.85 | 100 |
| INVENTIVE PRODUCT | 101.07 | 103.61 | 102.34 | 3.20 | 112 |

| TEST PRODUCT | No1 | No2 | No3 | No4 | No5 |
|---|---|---|---|---|---|
| ROLLING CUTTING DIAMETER Dt | M14 | M14 | M14 | M14 | M14 |
| FASTENING SCREW DIAMETER Ds | M6.5 | M7 | M8 | M9 | M9.5 |
| FASTENING SCREW DIAMETER RATIO | 46.4% | 50.0% | 57.1% | 64.3% | 67.9% |
| JUDGMENT | × | ○ | ○ | ○ | × |
| NUMBER OF MACHINED HOLES | 0 | 6891 | 7340 | 7315 | 0 |
| LIFE | TIP DAMAGE | WEAR | WEAR | WEAR | BODY DAMAGE |

| TEST PRODUCT | No1 | No2 | No3 | No4 | No5 |
|---|---|---|---|---|---|
| ROLLING CUTTING DIAMETER Dt | M14 | M14 | M14 | M14 | M14 |
| BOTTOM CONTACT SURFACE DIAMETER Df | 3 mm | 5.5 mm | 6.2 mm | 7.5 mm | 8 mm |
| BOTTOM CONTACT SURFACE DIAMETER RATIO | 21.4% | 39.3% | 44.3% | 53.6% | 57.1% |
| JUDGMENT | × | ○ | ○ | ○ | × |
| NUMBER OF MACHINED HOLES | 0 | 5848 | 7340 | 6714 | 328 |
| LIFE | LOOSENING DURING REVERSE ROTATION | WEAR | WEAR | WEAR | BODY DAMAGE |

INDEXABLE THREAD FORMING TAP

TECHNICAL FIELD

The present invention relates to an indexable thread forming tap and particularly to an improvement of an indexable thread forming tap having a tip detachably attached to a leading end portion of a body by screw-fastening.

BACKGROUND ART

An indexable rotating tool is proposed that has (a) a body in a shaft shape and (b) a tip concentrically and detachably attached to a leading end portion of the body by screw-fastening and rotationally driven around an axial center O along with the body for predetermined machining. A tap described in Patent Document 1 is an example thereof and has a body disposed with a screw hole concentrically to the axial center O while a tip has a penetrating attachment hole concentric to an axial center O, and an attachment screw penetrates through the attachment hole of the tip to be screwed into the screw hole of the body, thereby integrally fixing the tip to the body. Each of mating surfaces of the body and the tip has concave and convex portions, and the concave and convex portions are meshed with each other to prevent relative rotation around the axial center O.

Figure 17:
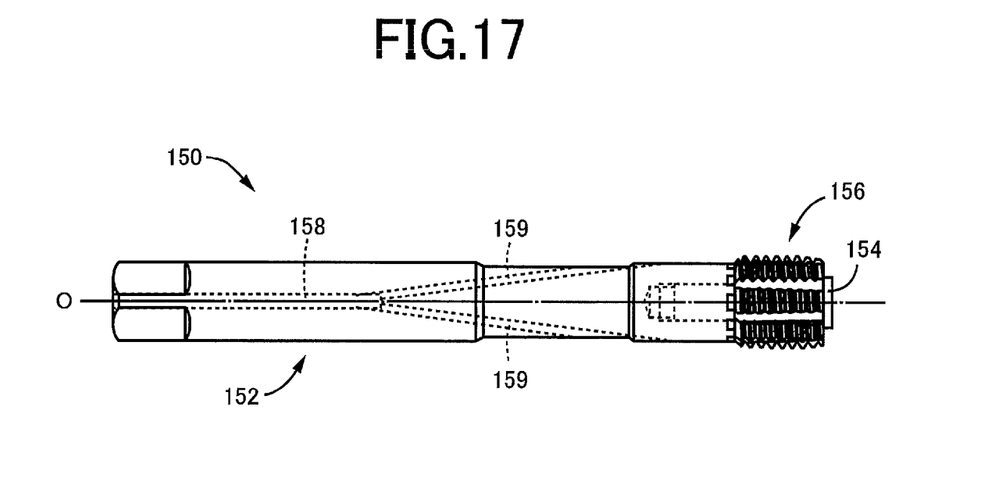
FIG. 17 is a diagram of an example of a conventional indexable thread forming tap and is a front view from the direction perpendicular to the axial center.
Figure 18:
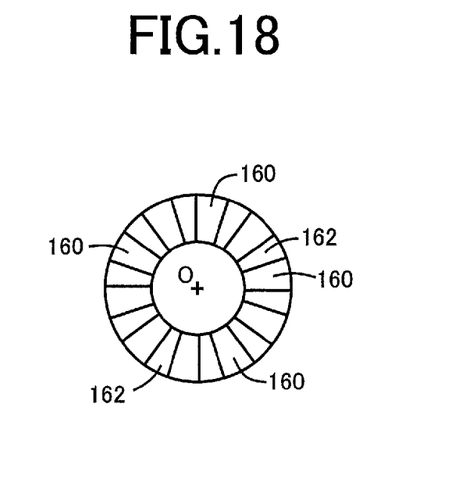
FIG. 18 is a diagram for explaining meshing teeth disposed in each of facing surfaces of the body and the tip of the indexable thread forming tap illustrated in FIG. 17.

FIGS. 17 and 18 depict a thread forming tap 150 that is an example of such a conventional indexable rotating tool, which has a tip 156 detachably attached via an attachment screw 154 to a body 152, and multiplicities of meshing teeth 160 and teeth grooves 162 are alternately radially disposed as depicted in FIG. 18 in each of facing surfaces of the body 152 and the tip 156 axially faced with each other and are meshed with each other to integrally fix the body 152 and the tip 156 to prevent relative rotation. FIG. 18 depicts the facing surface of the tip 156, which has the meshing teeth 160 having a width dimension set larger as compared to the teeth grooves 162, and the body 152 has reverse configuration to that of the facing surface of the tip 156. The body 152 is disposed with a fluid supply path 158 in the axial direction and the fluid supply path 158 is branched on the way into multiple i.e., two or more branch paths 159 in a Y shape such that cooling fluid is discharged obliquely forward from the branch paths 159 to cool a portion roll-formed by the tip 156.

Prior Art Documents

Patent Documents

Patent Document 1: U.S. Unexamined Patent Application Publication No. 2004/0185948
Patent Document 2: Publication of Japanese Patent No. 4117131

SUMMARY OF THE INVENTION

Problems to be Solved by the Invention

However, since an indexable rotating tool having a tip integrally fixed to a body by screwing an attachment screw through an attachment hole of the tip into a screw hole of the body in this way has three components, high accuracy of centering of the body and the tip is difficult to achieve while smaller cross-sectional areas of the components make it difficult to achieve sufficient strength, which may result in a sudden failure of a coupling portion due to load torque, and a tool life may problematically shorten or vary. Such variation in tool life makes it difficult to predict the timing of replacement of the tool and, therefore, unattended operation cannot be performed.

Although the indexable thread forming tap 150 depicted in FIGS. 17 and 18 can supply cooling fluid to a portion machined by the tip 156, since the fluid is obliquely discharged from positions away from the tip 156 through the multiple branch paths 159, sufficient cooling performance is not necessarily acquired because the fluid is dispersed by centrifugal force etc., and the tip 156 may be welded to a work, resulting in a crack of a rolling blade or breakage of the tap 150, which also causes the shortening or variation in a tool life.

On the other hand, in a technique proposed in Patent Document 2, a tip is integrally disposed with a screw shaft concentrically to an axial center O and is directly screwed into a screw hole disposed in a body such that an annular shoulder around the screw shaft of the tip is pressed against a leading end surface of the body so as to integrally fix the tip to the body. In this case, since a separate attachment screw is no longer necessary and a tool is made up of two components, i.e., the body and the tip, high centering accuracy is easily achieved and larger cross-sectional areas of the components increase the strength and suppress the variation in tool life; however, since the annular shoulder is pressed against the leading end surface of the body and tensile stress acts on the screw shaft, high fastening strength is hardly achieved. Particularly, in the case of cemented carbide widely used as tip material, the strength against tensile stress is lower as compared to compressive stress and, therefore, sufficient fastening strength cannot be achieved. Thus, for example, when a tool is reversely rotated (backed) and pulled out after rolling of a female thread as in the case of a thread forming tap, if dragging torque is generated by elasticity of the rolled female thread, the screw shaft is loosened and the tip may come off from the body. In other words, since the thread forming tap is disposed with the screw shaft and the screw hole in a twist direction defined as the tightening direction during rolling of a female thread, the tap is rotated in the loosening direction during backing and the screw shaft is loosened by dragging torque if fastening strength is lower. If the screw shaft integrally disposed on the tip is screwed and fastened into the screw hole of the body, concave and convex portions meshing with each other cannot be disposed on mating surfaces (facing surfaces) thereof and, therefore, the loosening of the screw shaft as described above poses a problem.

The present invention was conceived in view of the situations and it is therefore an object of the present invention to restrain variation in tool life and achieve high fastening strength in an indexable thread forming tap having a tip detachably attached to a leading end portion of a body by screw-fastening.

Means for Solving the Problem

To achieve the object, the first aspect of the invention provides an indexable thread forming tap comprising: (a) a body in a shaft shape; and (b) a tip concentrically and detachably attached to a leading end portion of the body by screw-fastening and rotationally driven around an axial center O along with the body for rolling of a female thread, (c) the body being disposed with a screw hole concentrically to the axial center O such that a screw shaft disposed on the tip concentrically to the axial center O is screwed into the screw hole for the screw-fastening, (d) a leading end surface of the screw shaft being pressed against a bottom surface of the screw hole into close contact with each other by the screw-fastening to integrally fix the tip to the body without the leading end of the body abutting on the tip, (e) the body being disposed with a restraining hole concentrically to the axial center O such that a restraining portion disposed on the tip concentrically to the axial center O is fitted into the restraining hole to position the body and the tip concentrically to the axial center O, wherein (f) an outer diameter of the leading end surface of the screw shaft brought into close contact with the bottom surface of the screw hole is within a range of 30 to 55% of a machining diameter of the tip, and wherein (g) a nominal diameter of the screw hole and the screw shaft is within a range of 48 to 66% of a machining diameter of the tip.

The axial center O is the axial center of the thread forming tap having the tip attached to the body and, since the tip and the body are concentrically coupled to each other, the respective axial centers of the tip and the body can be considered as the axial center O and these axial centers are referred to as the axial center O without distinction in this description. "To" between numerical values means that a lower limit value and an upper limit value of a numerical value range are included.

The second aspect of the invention provides the indexable thread forming tap recited in the first aspect of the invention, wherein a thread of the screw shaft is a reverse buttress thread having a flank angle of a leading flank smaller than a flank angle of a following flank.

(Deleted)

The third aspect of the invention provides the indexable thread forming tap recited in the first or second aspect of the invention, wherein (a) the body is disposed with a fluid supply path longitudinally through the axial center O to open in the bottom surface of the screw hole, wherein (b) the tip is disposed with a center hole on the axial center O from the leading end surface of the screw shaft and is disposed with a plurality of radial holes from an outer circumferential portion to communicate with the center hole, and wherein (c) cooling fluid is discharged from the fluid supply path of the body through the center hole and a plurality of the radial holes of the tip to outer circumferential side of the tip.

The fourth aspect of the invention provides the indexable thread forming tap recited in any one of the first to third aspects of the invention, wherein the leading end surface of the screw shaft has a convex-shaped taper surface concentric to the axial center O, wherein the bottom surface of the screw hole has a concave-shaped taper surface concentric to the axial center O having a taper angle equal to that of the taper surface of the screw shaft, and wherein the taper surfaces are pressed into surface contact with each other.

Effects of the Invention

In the indexable thread forming tap as described above, the screw shaft disposed on the tip is screwed into the screw hole disposed in the body for screw-fastening and the tip is detachably attached to the body by this screw-fastening while the restraining portion of the tip is fitted into the restraining hole disposed in the body so that the body and the tip are positioned concentrically to the axial center O. As a result, since a separate attachment screw is no longer necessary as is the case with Patent Document 2 and the tool is made up of two components, i.e., the body and the tip, high centering accuracy is easily achieved and larger cross-sectional areas of the components increase the strength and suppress the variation in tool life so that an excellent tool life is stably achieved.

Since the leading end surface of the screw shaft is pressed against the bottom surface of the screw hole in close contact with each other by screw-fastening and the tip is integrally fixed to the body, compressive stress acts on the screw shaft and the tip can be fastened to the body with higher fastening strength as compared to the tool of Patent Document 2, in which tensile stress acts on the screw shaft. As a result, when the tool is reversely rotated (backed) and pulled out after rolling of a female thread, even if dragging torque is generated by elasticity of the rolled female thread, the tip can properly be prevented from coming off from the body due to loosening of the screw shaft because of the dragging torque.

Further, since the outer diameter of the leading end surface of the screw shaft brought into close contact with the bottom surface of the screw hole is within a range of 30 to 55% of the machining diameter of the tip, high fastening strength can be achieved by frictional contact between the bottom surface of the screw hole and the leading end surface of the screw shaft while the strength of the body disposed with the screw hole is properly maintained. Although the fastening strength is changed depending on the material of the body and the tip, if the outer diameter of the leading end surface of the screw shaft becomes less than 30% of the machining diameter, the torque from the contact friction between the leading end surface and the bottom surface of the screw hole becomes too small to achieve sufficient fastening strength and, if the outer diameter of the leading end surface of the screw shaft exceeds 55% of the machining diameter, a thickness around the screw hole of the body is reduced and the body is easily damaged.

Further, since the nominal diameter of the screw hole and the screw shaft is within a range of 48 to 66% of the machining diameter of the tip, high fastening strength can be achieved by screw-fastening of the screw hole and the screw shaft while the strength of the tip and the body is properly maintained. Although the fastening strength is changed depending on the material of the body and the tip, if the nominal diameter of threads becomes less than 48% of the machining diameter, the screw shaft becomes thin and the tip is easily damaged and, if the nominal diameter of threads exceeds 66% of the machining diameter, the thickness around the screw hole of the body is reduced and the body is easily damaged.

Since the cooling fluid is discharged from the fluid supply path disposed in the body through the center hole and the multiple radial holes of the tip to the outer circumferential side of the tip in the third aspect of the invention, the cooling fluid can certainly be supplied to the portion of rolling by the tip and excellent cooling performance can be achieved. As a result, welding due to lack of cooling is suppressed and an excellent tool life is stably achieved.

In the fourth aspect of the invention, both the leading end surface of the screw shaft and the bottom surface of the screw hole are taper surfaces concentric to the axial center O and are pressed into surface contact with each other. As a result, the leading end surface of the screw shaft and the bottom surface of the screw hole not only achieve high fastening strength due to contact friction therebetween but also are centered concentrically to the axial center O and, therefore, also because of the fitting between the restraining hole and the restraining portion, the body and the tip are positioned concentrically to the axial center O with higher accuracy.

MODE FOR CARRYING OUT THE INVENTION

MODE FOR CARRYING OUT THE INVENTION

Although die steel or high-speed tool steel is preferably used for a body and cemented carbide is preferably used for a tip, other tool materials and hard materials are also employable.

A twist direction of threads of a screw shaft disposed on the tip and a screw hole disposed in the body is desirably set such that screws are tightened by rotation resistance during machining in the case of the indexable thread forming tap rotationally driven for rolling of a female thread in one direction around an axial center O. For example, if the tool is rotationally driven clockwise for machining when viewed from the body side, both the screw shaft and the screw hole may have right-hand threads.

Since a leading end surface of the screw shaft is pressed against a bottom surface of the screw hole in close contact with each other by screw-fastening, predetermined fastening strength is achieved by friction due to surface contact between the leading end surface and the bottom surface and friction between the screw shaft and the screw hole. Although the leading end surface of the screw shaft and the bottom surface of the screw hole are defined as flat surfaces perpendicular to, for example, the axial center O, the surfaces can be defined as taper surfaces as in the fourth aspect of the invention or can be a convexly-curved surface and a concavely-curved surface such as partial spherical surfaces, or other various forms are available. Although the screw shaft and the screw hole may have a screw thread shape of a normal triangular thread, a saw-tooth-shaped buttress thread etc. may also be employed.

Although a restraining hole disposed in the body is disposed in an opening portion of the screw hole, for example, and a restraining portion disposed on the tip is disposed on a base end portion of the screw shaft, the restraining hole may be disposed in the bottom portion of the screw hole while the restraining portion may be disposed on the leading end portion of the screw shaft. The restraining hole and the restraining portion have a cylindrical shape with a constant radial dimension, for example, and a suitable fitting tolerance thereof is on the level of the grade H6/h6, for example. A slight gap may be generated therebetween or slight interference fitting may be achieved. At least one of an outer circumferential surface of the restraining portion and an inner circumferential surface of the restraining hole may be defined as a taper surface, and the restraining portion and the restraining hole may be centered and positioned concentrically to the axial center O through engagement of the taper surface. In this case, the tool is configured such that screw-fastening is allowed to press the leading end surface of the screw shaft against the bottom surface of the screw hole due to elastic deformation etc., of the restraining hole regardless of the engagement of the taper surface.

Although a fluid supply path is disposed longitudinally through the axial center O of the body to open in the bottom surface of the screw hole and cooling fluid is discharged through a center hole and a plurality of radial holes of the tip to an outer circumferential side of the tip in the third aspect of the invention, the fluid supply path, the center hole, and the radial holes may appropriately be disposed as needed and the cooling fluid may directly be supplied to a portion machined by the tip through external oil feed. The cooling fluid may obliquely be discharged from the body as in the conventional example of FIG. 17, or other various forms are available. Although an oil agent for cooling and lubrication is preferably used for the cooling fluid, gas such as cooling air can also be supplied. The oil agent can be supplied in a liquid state or can be supplied in a mist state.

An example of the present invention will now be described in detail with reference to the drawings.

Figure 1:
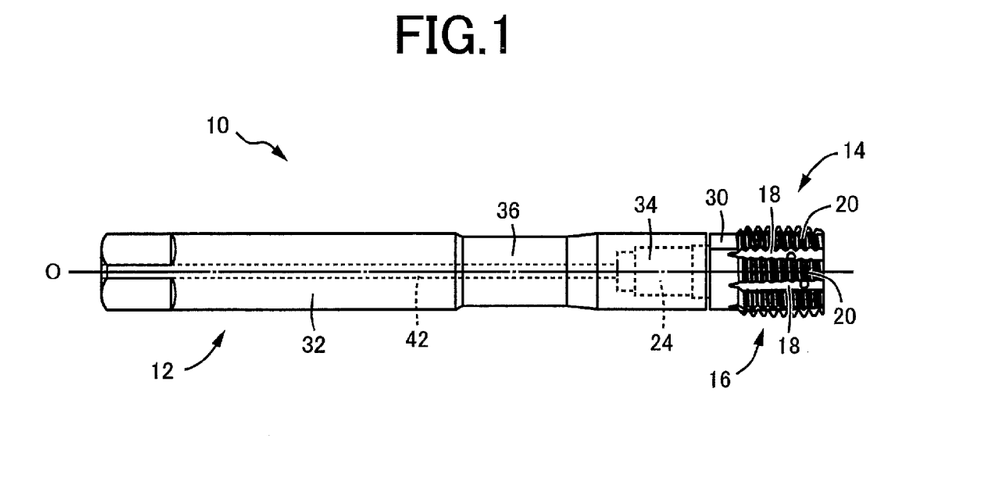
FIG. 1 is a diagram of an indexable thread forming tap that is an example of the present invention and is a front view seen from the direction perpendicular to the axial center O.
Figure 2:
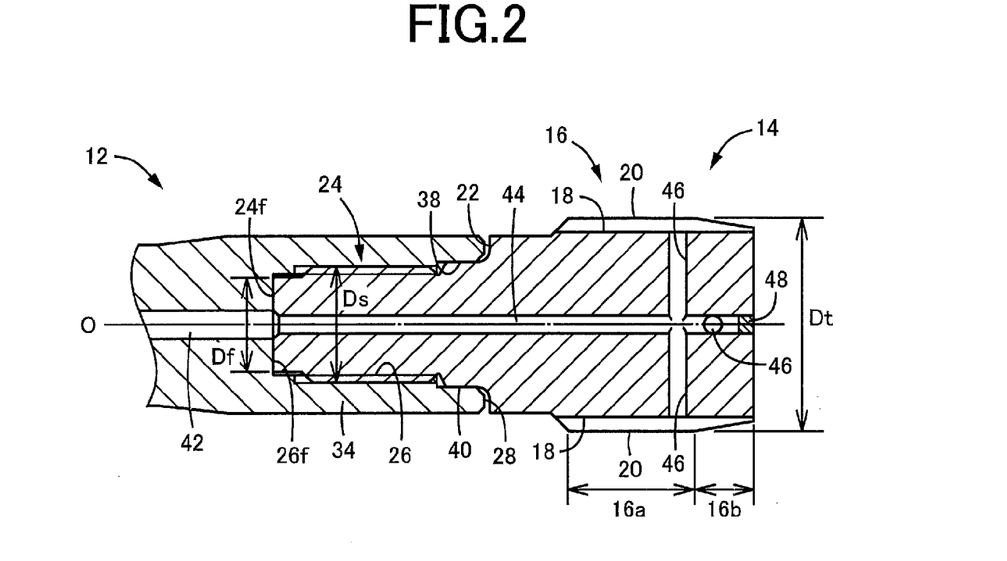
FIG. 2 is an enlarged cross-sectional view of a leading end portion including a tip of the indexable thread forming tap illustrated in FIG. 1.
Figure 3:
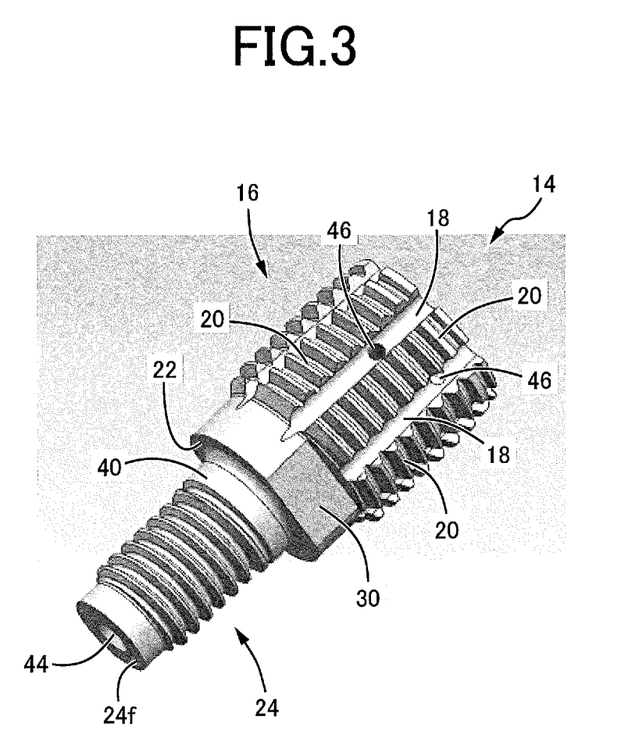
FIG. 3 is a perspective view of only the tip of the indexable thread forming tap illustrated in FIG. 1.

FIG. 1 is a diagram of an indexable thread forming tap (hereinafter simply referred to as a thread forming tap) 10 that is an example of the present invention and is a front view seen from the direction perpendicular to an axial center O. FIG. 2 is an enlarged cross-sectional view of a leading end portion including a tip 14 of the thread forming tap 10 and FIG. 3 is a perspective view of only the tip 14. The thread forming tap 10 includes a body 12 in a shaft shape and the tip 14 concentrically and detachably attached to a leading end portion of the body 12 by screw-fastening, and is rotationally driven around the axial center O for rolling of a thread by the tip 14. The body 12 is made of die steel or high-speed tool steel while the tip 14 is made of cemented carbide. A surface of the tip 14 is coated with a hard film as needed.

The tip 14 includes a male thread portion 16 having an outer circumferential surface disposed with a male thread corresponding to a female thread to be machined, and the male thread portion 16 is disposed with a plurality of (in this example, eight) oil communicating grooves 18 in parallel with the axial center O and the male thread is circumferentially divided into multiple parts. The male thread portion 16 has a screw thread disposed to form a cross section of a regular polygonal shape, which is a substantially octagonal shape in this example, made up of outwardly curved sides, and eight projecting portions corresponding to vertexes of the octagonal shape act as rolling blades 20 and cut into, and plastically deform, a surface layer portion of a prepared hole in a work for rolling of a female thread. The oil communicating grooves 18 are disposed on respective sides of an octagon. The male thread portion 16 includes a complete thread portion 16a with a substantially constant diameter dimension of the rolling blade 20 and a leading portion 16b with a radial dimension gradually decreasing toward the leading end side. The tip 14 of this example is used for rolling of a right-hand female thread of M14×1.5 and is rotationally driven clockwise during lead feed when viewed from the body 12 and, as a result, the tip 14 is screwed into a prepared hole of a work for rolling of a female thread with the rolling blade 20. A diameter dimension Dt of FIG. 2 is a rolling cutting diameter that is a machining diameter of the tip 14 and is 14 mm in this example.

A screw shaft 24 is disposed concentrically to the axial center O to stand on an end surface 22 of the male thread portion 16 on the complete thread portion 16a side and is screwed into a screw hole 26 disposed in the body 12 concentrically to the axial center O to press a leading end surface 24f of the screw shaft 24 against a bottom surface 26f of the screw hole 26 in close contact with each other, and the tip 14 is integrally attached to the body 12. Both the leading end surface 24f and the bottom surface 26f are flat surfaces perpendicular to the axial center O and predetermined fastening strength is achieved by friction due to surface contact therebetween and friction due to surface contact between screw threads of the screw shaft 24 and the screw hole 26. In this fastened state, a predetermined gap is formed between a leading end of the body 12, i.e., an end surface 28 of the screw hole 26 on the opening side, and the end surface 22 of the male thread portion 16 of the tip 14 such that the leading end surface 24f of the screw shaft 24 is certainly pressed against the bottom surface 26f of the screw hole 26 by screw-fastening between the screw shaft 24 and the screw hole 26. The twist direction of threads of the screw shaft 24 and the screw hole 26 is defined such that screws are tightened by rotation resistance during rolling by the tip 14 and both the screw shaft 24 and the screw hole 26 have right-hand threads in the thread forming tap 10 of this example rotationally driven clockwise for rolling when viewed from the body 12. The male thread portion 16 is disposed with a tool locking portion 30, that has a flat shape, and, when the tip 14 is fastened to the body 12, the tool can be locked to apply a torque.

A bottom contact surface diameter Df for bringing the leading end surface 24f of the screw shaft 24 into close contact with the bottom surface 26f of the screw hole 26, i.e., an outer diameter dimension of the leading end surface 24f, is within a range of 30 to 55% of the rolling cutting diameter Dt, or specifically, within a range of 4.2 to 7.7 mm. A nominal diameter of threads of the screw shaft 24 and the screw hole 26, i.e., a fastening screw diameter Ds, is within a range of 48 to 66% of the rolling cutting diameter Dt, or specifically, within a range of 6.72 to 9.24 mm and, for example, threads of M7 to M9 are provided. The fastening screw diameter Ds is a larger value than the bottom contact surface diameter Df.

The body 12 forms a stepped columnar shape having different radial dimensions, concentrically and integrally includes a shank 32 on a rear side, a coupling portion 34 on a leading end side, and a small-diameter neck portion 36 therebetween, and is disposed with the screw hole 26 in the coupling portion 34. An opening portion of the screw hole 26 is disposed with a restraining hole 38 having a constant diameter dimension larger than the fastening screw diameter Ds concentrically to the axial center O while a base end portion of the screw shaft 24 of the tip 14 is disposed with a restraining portion 40 having a cylindrical outer circumferential surface with substantially the same diameter dimension as the restraining hole 38 concentrically to the axial center O and, when the restraining portion 40 is fit into the restraining hole 38 in accordance with screw-fastening, the body 12 and the tip 14 are positioned concentrically to the axial center O. The restraining hole 38 and the restraining portion 40 are disposed with a fitting tolerance on the level of the grade H6/h6, for example, and are highly accurately positioned concentrically to the axial center O.

The body 12 is disposed with a fluid supply path 42 from a rear end of the shank 32 side longitudinally through the axial center O to open in the bottom surface 26f of the screw hole 26 while the tip 14 is disposed with a center hole 44 from the leading end surface 24f of the screw shaft 24 on the axial center O and is also disposed with multiple radial holes 46 from an outer circumferential portion to communicate with the center hole 44. All the multiple radial holes 46 are disposed, for example, orthogonally to the axial center O, to open in groove bottoms of the oil communicating grooves 18 of the male thread portion 16, and the eight radial holes 46 are disposed in accordance with the oil communicating grooves 18. The center hole 44 is disposed to axially penetrate the tip 14 and an opening portion on the leading end side is closed by a plug member 48. Therefore, when cooling fluid is supplied from the rear end of the body 12 into the fluid supply path 42, the cooling fluid is discharged through the center hole 44 and the multiple radial holes 46 of the tip 14 into the oil communicating grooves 18 of the male thread portion 16, and a portion roll-formed by the male thread portion 16 is properly cooled and lubricated. The cooling fluid is cooling air, cooling oil agent, lubrication oil agent, etc.

In the thread forming tap 10 as described above, the screw shaft 24 disposed on the tip 14 is screwed into the screw hole 26 disposed in the body 12 for screw-fastening and the tip 14 is detachably attached to the body 12 by this screw-fastening while the restraining portion 40 of the tip 14 is fitted into the restraining hole 38 disposed in the body 12 so that the body 12 and the tip 14 are positioned concentrically to the axial center O. As a result, since a separate attachment screw is no longer necessary as is the case with Patent Document 2 and the tool is made up of two components, i.e., the body 12 and the tip 14, high centering accuracy is easily achieved and larger cross-sectional areas of the components increase the strength and suppress the variation in tool life so that an excellent tool life is stably achieved.

Since the leading end surface 24f of the screw shaft 24 is pressed against the bottom surface 26f of the screw hole 26 in close contact with each other by screw-fastening and the tip 14 is integrally fixed to the body 12, compressive stress acts on the screw shaft 24 and the tip 14 can be fastened to the body 12 with higher fastening strength as compared to the tool of Patent Document 2, in which tensile stress acts on the screw shaft. Since the tip 14 is made of cemented carbide in this example, the strength against tensile stress is lower as compared to compressive stress, and the fastening strength can significantly be improved since compressive stress is applied by screw-fastening. As a result, when the thread forming tap 10 is reversely rotated (backed) and pulled out after rolling of a female thread, even if dragging torque is generated by elasticity of the rolled female thread, the tip 14 can properly be prevented from coming off from the body 12 due to loosening of the screw shaft 24 because of the dragging torque.

Since the bottom contact surface diameter Df, i.e., the outer diameter of the leading end surface 24f of the screw shaft 24 brought into close contact with the bottom surface 26f of the screw hole 26, is within a range of 30 to 55% of the rolling cutting diameter Dt, i.e., the machining diameter of the tip 14 in this example, high fastening strength can be achieved by frictional contact between the bottom surface 26f of the screw hole 26 and the leading end surface 24f of the screw shaft 24 while the strength of the body 12 disposed with the screw hole 26 is properly maintained. In particular, if the bottom contact surface diameter Df becomes less than 30% of the rolling cutting diameter Dt, the torque from the contact friction between the leading end surface 24f and the bottom surface 26f becomes too small to achieve sufficient fastening strength and, if the bottom contact surface diameter Df exceeds 55% of the rolling cutting diameter Dt, a thickness around the screw hole 26 of the body 12 is reduced and the body 12 is easily damaged.

Since the nominal diameter of the screw shaft 24 and the screw hole 26, i.e., the fastening screw diameter Ds, is within a range of 48 to 66% of the rolling cutting diameter Dt, i.e., the machining diameter of the tip 14 in this example, high fastening strength can be achieved by screw-fastening of the screw shaft 24 and the screw hole 26 while the strength of the tip 14 and the body 12 is properly maintained. In particular, if the fastening screw diameter Ds becomes less than 48% of the rolling cutting diameter Dt, the screw shaft 24 becomes thin and the tip 14 is easily damaged and, if the fastening screw diameter Ds exceeds 66% of the rolling cutting diameter Dt, the thickness around the screw hole 26 of the body 12 is reduced and the body 12 is easily damaged.

Since the cooling fluid is discharged from the fluid supply path 42 disposed in the body 12 through the center hole 44 and the multiple radial holes 46 of the tip 14 to an outer circumferential side of the tip 14 in this example, the cooling fluid can certainly be supplied to a portion roll-formed by the tip 14 and excellent cooling performance can be achieved. As a result, welding due to lack of cooling is suppressed and an excellent tool life is stably achieved.

<Breakage Strength Test>

Figure 4:
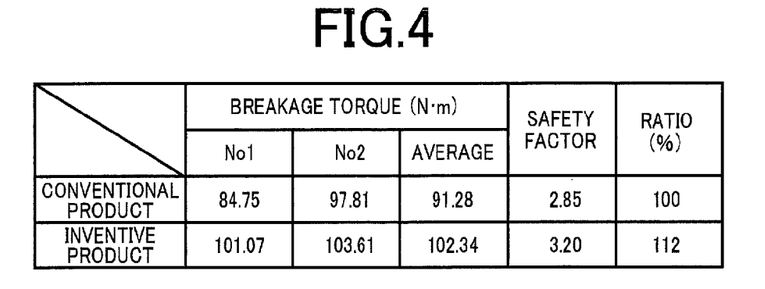
FIG. 4 is a diagram for explaining the result of <Breakage Strength Test> in which two products were prepared for each of a conventional product and an inventive product to examine breakage torque.
Figure 5:
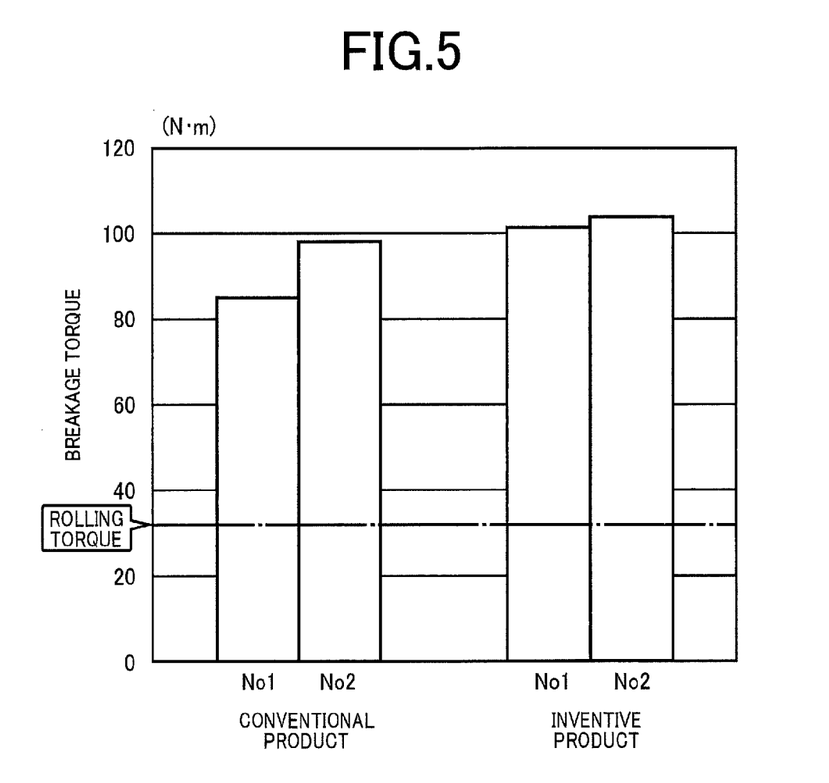
FIG. 5 is a graph of comparison of the result acquired in examining the breakage torque illustrated in FIG. 4.

Two products numbered as No. 1 and No. 2 were prepared for each of an inventive product of the example and a conventional product depicted in FIGS. 17 and 18 to examine breakage strength under the following test conditions, and the results depicted in FIGS. 4 and 5 were acquired. The breakage strength was measured as "breakage torque" that is maximum torque before breakage when a thread forming tap is screwed into a prepared hole with a depth of 10 mm (abutting on the bottom) until the tap is broken. A "safety factor" is a value acquired by dividing the breakage torque by rolling torque, and the rolling torque is torque at the time of normal rolling of a female thread on a prepared hole that is a through-hole, and is 32 (N·m) in this test.

<Test Conditions> nominal size: M14×1.5; prepared hole diameter: ϕ13.3 (blind hole 10 mm deep); rolled material: SCM440 (chromium molybdenum steel defined by JIS); rolled material hardness: 30HRC; rolling speed: 6 m/min; machining machine: radial drilling machine; and cutting oil agent: mist As apparent from the test result of FIG. 4, while the conventional products have average breakage torque of 91.28 (N·m) and a safety factor of 2.85, the inventive products have average breakage torque of 102.34 (N·m) and a safety factor of 3.20 and, therefore, the breakage torque and the safety factor are improved by about 12%. FIG. 5 is a graph comparing the breakage torques of the four test products and the conventional products have large variation in breakage torque of 13.06 (N·m) for the two test products while the inventive products have small variation in breakage torque of 2.54 (N·m), which reveals that stable breakage strength is achieved.

<Durability Test 1>

Figure 6:
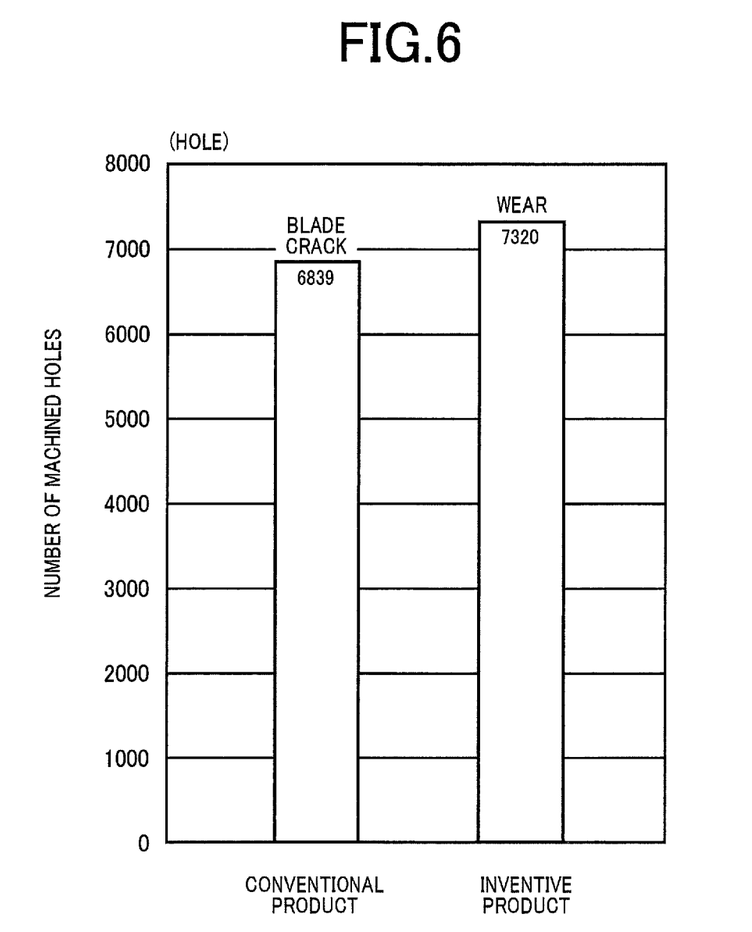
FIG. 6 is a graph of results of <Durability Test 1> in which study on durability (the number of machined holes) was executed when each of the conventional product and the inventive product was used for rolling of female threads.

FIG. 6 is a diagram of results of study on durability when the inventive product of the example and the conventional product depicted in FIGS. 17 and 18 were used for rolling of female threads under the following test conditions.

<Test Conditions> nominal size: M14×1.5; prepared hole diameter: ϕ13.3 (through-hole); hole depth: 30 mm; rolled material: SCM440 (chromium molybdenum steel defined by JIS); rolled material hardness: 30HRC; rolling speed: 30 m/min; and cutting oil agent: water soluble As apparent from FIG. 6, the inventive product has durability (the number of machined holes) improved by 7% as compared to the conventional product. While the conventional product suddenly comes to the end of life due to crack of the rolling blade and therefore makes life prediction difficult, the inventive product comes to the end of life due to wear of the rolling blade, the life prediction can be performed from a change in rolling torque, which enables unattended operation.

<Durability Test 2>

Figure 7:
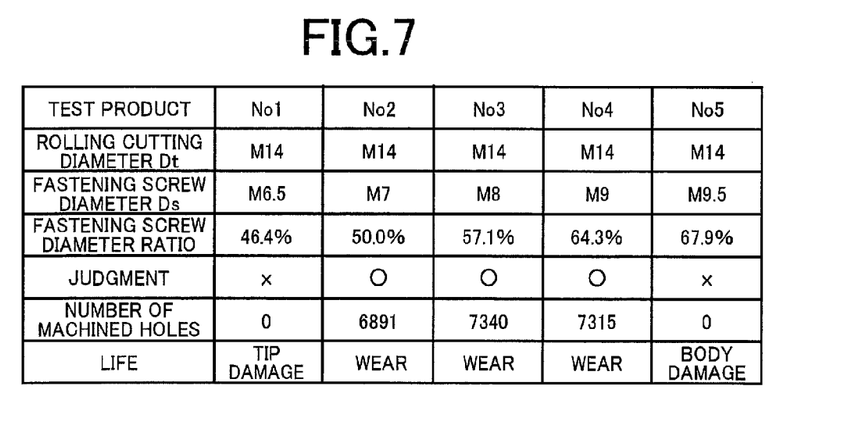
FIG. 7 is a diagram for explaining results of <Durability Test 2> in which study on durability was executed when five types of test products with different fastening screw diameters of the tip and the body were prepared to perform rolling of female threads.
Figure 8:
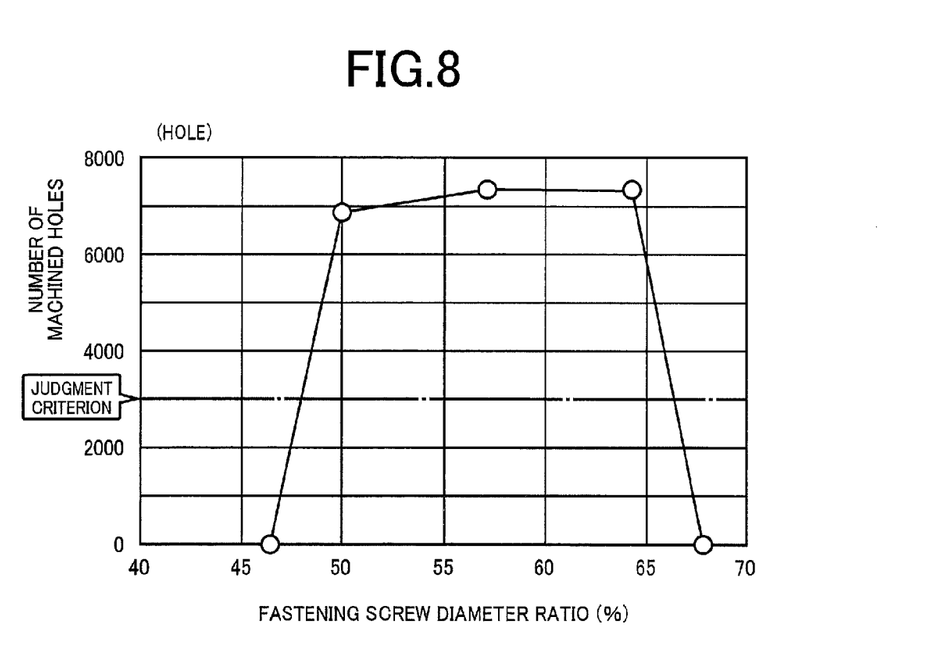
FIG. 8 is a graph of the results of durability (the number of machined holes) of the test products illustrated in FIG. 7 with the horizontal axis indicative of a fastening screw diameter ratio.

FIG. 7 is a diagram for explaining results of study on durability when five types of test products (thread forming taps) No. 1 to No. 5 with different fastening screw diameters Ds were prepared to perform rolling of female threads under the following test conditions. FIG. 8 is a graph of durability (the number of machined holes) of the test products with the horizontal axis indicative of a fastening screw diameter ratio. The respective fastening screw diameters Ds of the five types of the test products are M6.5, M7, M8, M9, and M9.5, and the "fastening screw diameter ratio" is (fastening screw diameter Ds/rolling cutting diameter Dt). A circle mark (acceptance) and a cross mark (rejection) in a "judgment" field are judged by using 3000 holes as a judgment criterion, and acceptance (circle mark) means 3000 or more holes.

<Test Conditions> nominal size: M14×1.5; prepared hole diameter: ϕ13.3 (through-hole); hole depth: 30 mm; rolled material: SCM440 (chromium molybdenum steel defined by JIS); rolled material hardness: 30HRC; rolling speed: 6 m/min; and cutting oil agent: mist As apparent from the results depicted in FIGS. 7 and 8, the test products No. 2 to No. 4 with the fastening screw diameter ratio of 50 to 64.3% were capable of rolling of female threads for about 7000 holes and achieved excellent durability. On the other hand, the test product No. 1 with the fastening screw diameter ratio of 46.4% was unable to machine a hole due to damage of the tip 14 and the test product No. 5 with the fastening screw diameter ratio of 67.9% was unable to machine a hole due to damage of the body 12. Therefore, the fastening screw diameter Ds is desirably within a range of 48 to 66% of the rolling cutting diameter Dt.

<Durability Test 3>

Figure 9:
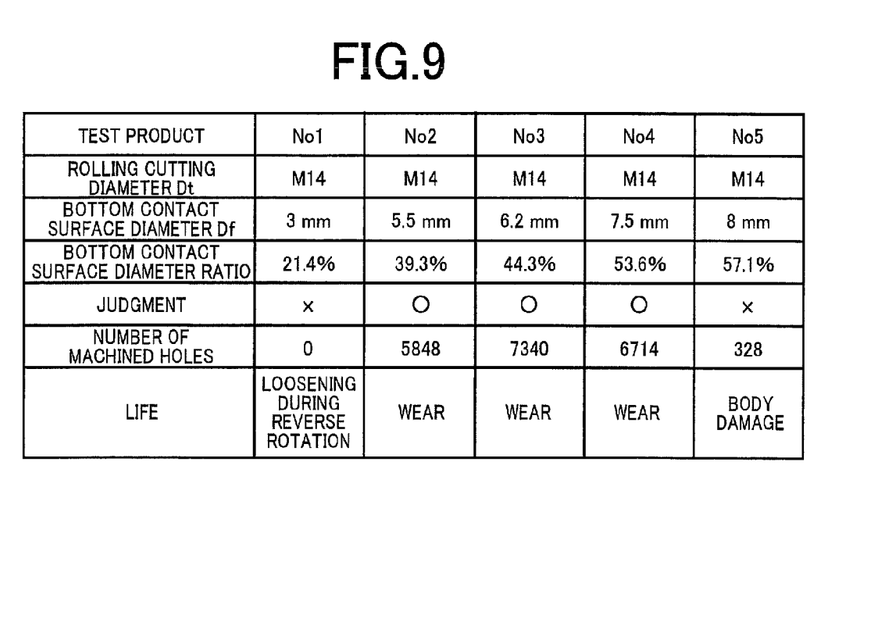
FIG. 9 is a diagram for explaining results of <Durability Test 3> in which study on durability was executed when five types of test products with different bottom contact surface diameters of the tip and the body were prepared to perform rolling of female threads.
Figure 10:
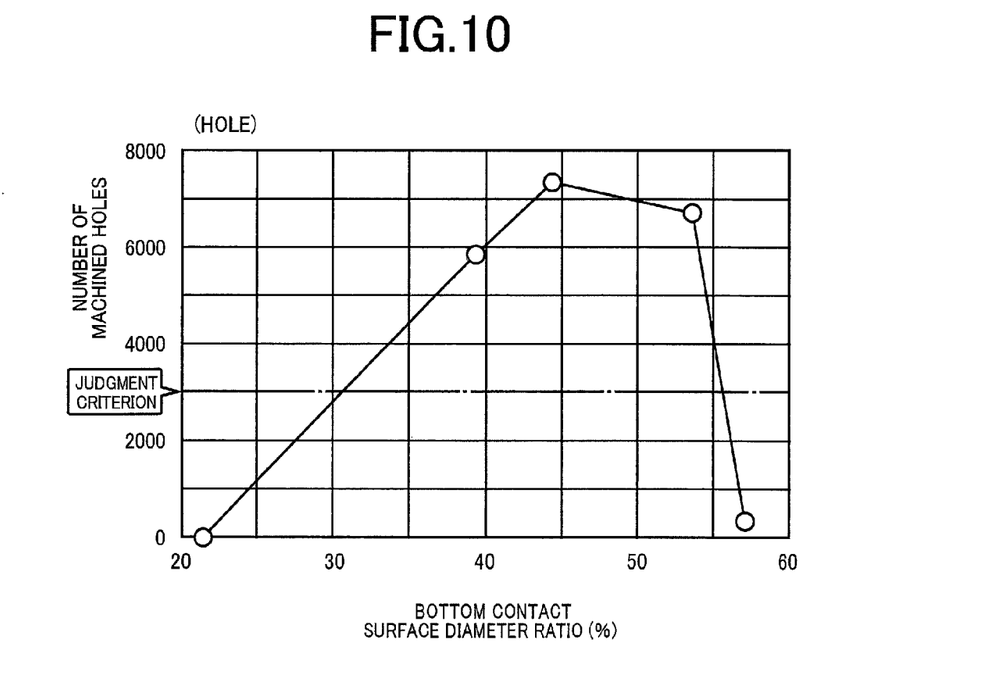
FIG. 10 is a graph of the results of durability (the number of machined holes) of the test products illustrated in FIG. 9 with the horizontal axis indicative of a bottom contact surface diameter ratio.

FIG. 9 is a diagram for explaining results of study on durability when five types of test products (thread forming taps) No. 1 to No. 5 with different bottom contact surface diameters Df were prepared to perform rolling of female threads under the same test conditions as <Durability Test 2>. FIG. 10 is a graph of durability (the number of machined holes) of the test products with the horizontal axis indicative of a bottom contact surface diameter ratio. The respective bottom contact surface diameters Df of the five types of the test products are 3 mm, 5.5 mm, 6.2 mm, 7.5 mm, and 8 mm, and the "bottom contact surface diameter ratio" is (bottom contact surface diameter Df/rolling cutting diameter Dt). A circle mark (acceptance) and a cross mark (rejection) in a "judgment" field are judged by using 3000 holes as a judgment criterion, and acceptance (circle mark) means 3000 or more holes.

As apparent from the results depicted in FIGS. 9 and 10, the test products No. 2 to No. 4 with the bottom contact surface diameter ratio of 39.3 to 53.6% were capable of rolling of female threads for about 5000 or more holes and achieved excellent durability. On the other hand, the test product No. 1 with the bottom contact surface diameter ratio of 21.4% was unable to machine a hole because a fastening screw was loosened and the tip 14 came off during baking after rolling. In the test product No. 5 with the bottom contact surface diameter ratio of 57.1%, the body 12 was damaged by rolling of female threads of 328 holes. Therefore, the bottom contact surface diameter Df is desirably within a range of 30 to 55% of the rolling cutting diameter Dt.

<Durability Test 4>

Figure 11:
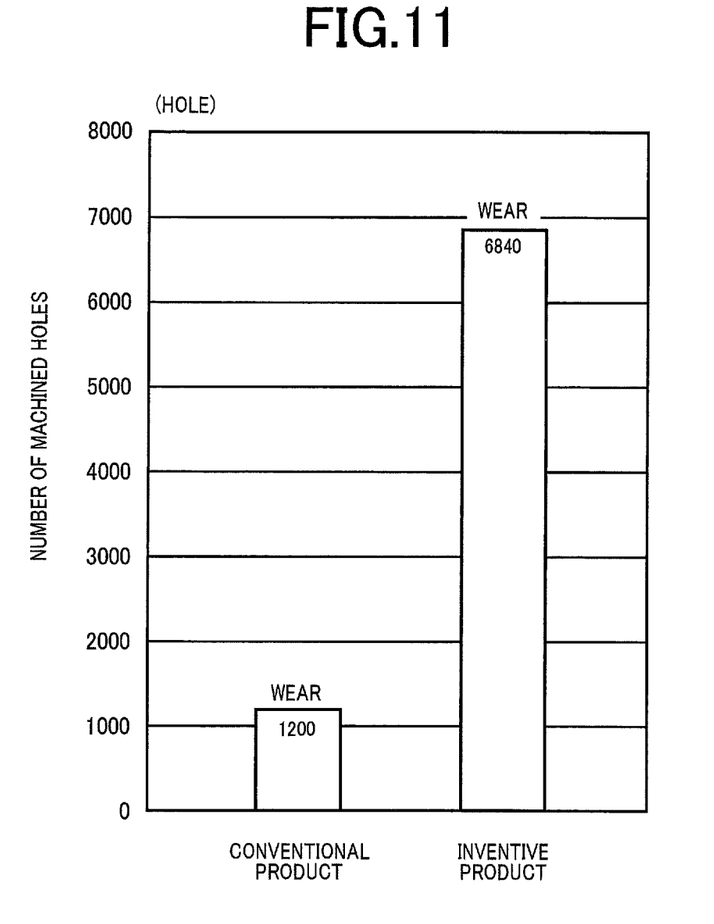
FIG. 11 is a graph of results of <Durability Test 4> in which study on durability (the number of machined holes) was executed when each of the conventional product and the inventive product was used for rolling of female threads.

FIG. 11 is a diagram of results of study on durability when the inventive product of the example and the conventional product depicted in FIGS. 17 and 18 were used for rolling of female threads under the following test conditions.

<Test Conditions> nominal size: M14×1.5; prepared hole diameter: ϕ13.3 (through-hole); hole depth: 30 mm; rolled material: S50C (carbon steel for machine structure defined by JIS, raw material); rolling speed: 15 m/min; and cutting oil agent: mist As apparent from FIG. 11, the inventive product has durability (the number of machined holes) increased by a factor of five or more as compared to the conventional product. This is thought to be due to the fact that, while the rolled material is material relatively easily causing welding and the conventional product obliquely emits mist from the body 152 and therefore cannot achieve proper lubrication performance, resulting in early wear of the rolling blade due to welding, the inventive product emits mist from the fluid supply path 42 disposed in the body 12 through the center hole 44 and the multiple radial holes 46 of the tip 14 directly to the portion of rolling by the male thread portion 16 and therefore achieves excellent cooling performance and properly suppresses welding.

Other examples of the present invention will be described. In the following examples, the portions substantially common to the examples are denoted by the same reference numerals and will not be described in detail.

Figure 12:
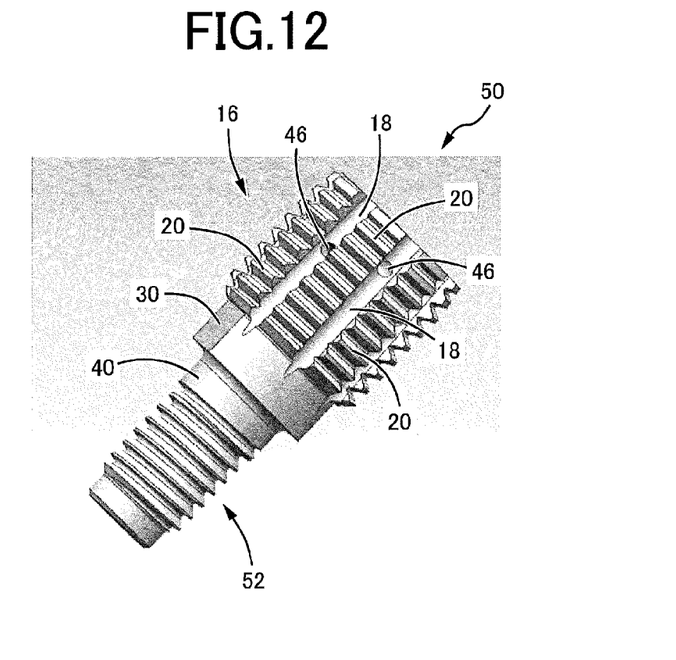
FIG. 12 is a front view of another example of the tip preferably used in the indexable thread forming tap illustrated in FIG. 1.

FIG. 12 is a front view of a tip 50 usable instead of the tip 14 and has a different screw thread shape of a screw shaft 52 as compared to the tip 14. In particular, although the thread of the screw shaft 24 of the tip 14 is a normal triangular thread having a screw thread shape of a substantially regular triangle, the thread of the screw shaft 52 of the tip 50 is a saw-tooth-shaped reverse buttress thread having a flank angle of a leading flank (clearance flank) smaller than a flank angle of a following flank (pressure flank).

Figure 13:
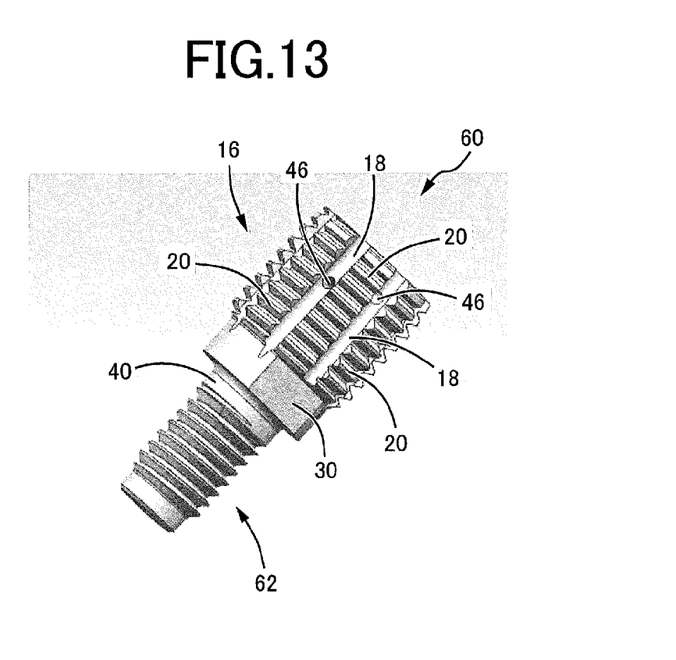
FIG. 13 is a front view of a further example of the tip preferably used in the indexable thread forming tap illustrated in FIG. 1.

A tip 60 of FIG. 13 is also usable instead of the tip 14 and, although a thread of a screw shaft 62 has a saw tooth shape as is the case with the screw shaft 52 of the tip 50, this is the case of a forward buttress thread having a flank angle of a following flank (pressure flank) smaller than a flank angle of a leading flank (clearance flank) unlike the screw shaft 52.

Figure 14:
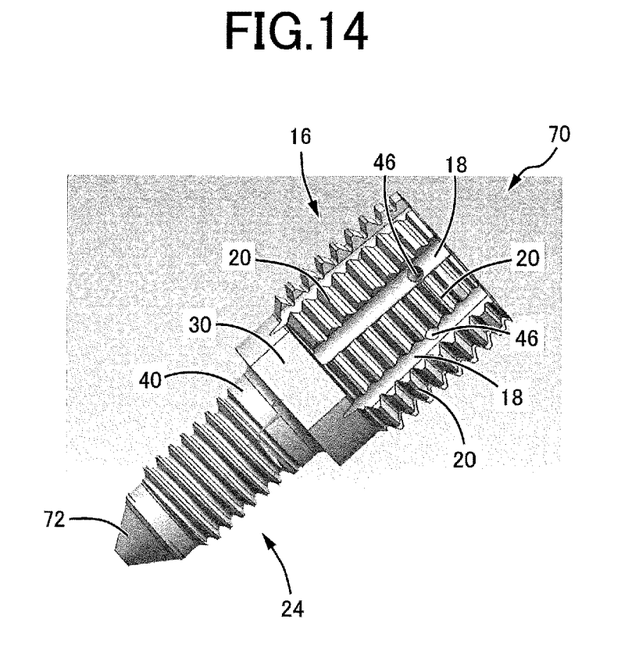
FIG. 14 is a front view of a still further example of the tip preferably used in the indexable thread forming tap illustrated in FIG. 1.
Figure 15:
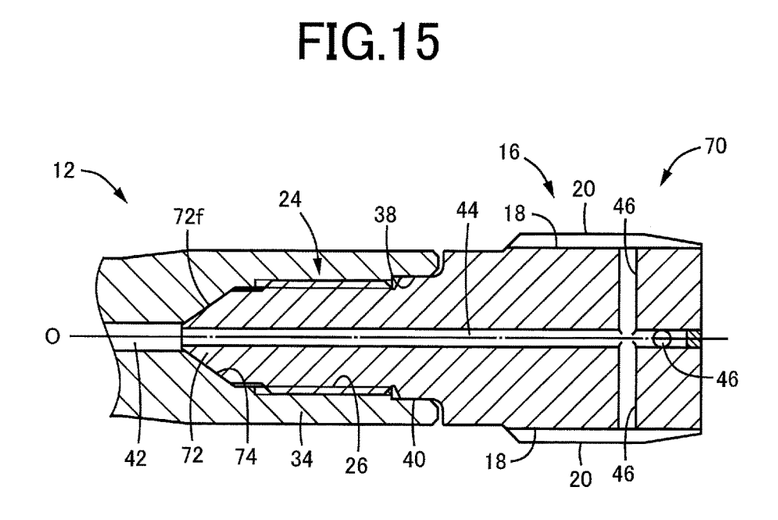
FIG. 15 is a cross-sectional view of a leading end portion of an indexable thread forming tap with the tip illustrated in FIG. 14 used.

A tip 70 of FIG. 14 is also usable instead of the tip 14 and is disposed with a tapered convex portion 72 concentrically to the axial center O at the leading end of the screw shaft 24 while the bottom portion of the screw hole 26 of the body 12 is disposed with a concave-shaped tapered bottom surface 74 having a taper angle equal to that of the tapered convex portion 72 concentrically to the axial center O as depicted in FIG. 15. When the screw shaft 24 is screwed and screw-fastened into the screw hole 26, a tapered outer circumferential surface 72f of the tapered convex portion 72 is pressed against the tapered bottom surface 74 of the screw hole 26 in surface contact with each other. As a result, the tapered outer circumferential surface 72f and the tapered bottom surface 74 not only achieve high fastening strength due to contact friction therebetween but also are centered concentrically to the axial center O and, therefore, also because of the fitting between the restraining hole 38 and the restraining portion 40, the body 12 and the tip 70 are positioned concentrically to the axial center O with higher accuracy. The tapered outer circumferential surface 72f corresponds to the leading end surface of the screw shaft 24 and the tapered bottom surface 74 corresponds to the bottom surface of the screw hole 26.

Figure 16:
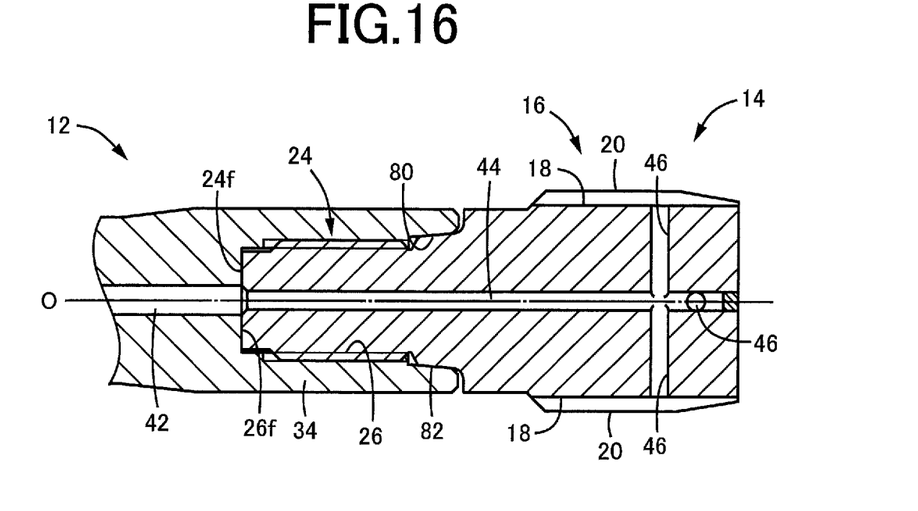
FIG. 16 is a diagram for explaining another example of the present invention and is a cross-sectional view corresponding to FIG. 2.

FIG. 16 is a cross-sectional view corresponding to FIG. 2 and, in this example, a restraining hole 80 disposed in the leading end portion of the body 12 has a taper surface with a diameter increasing toward an opening end and is disposed concentrically to the axial center O. An outer circumferential surface of a restraining portion 82 disposed on the base end portion of the screw shaft 24 of the tip 14 is a taper surface having a diameter decreasing as a distance from the male thread portion 16 increases and a taper angle equal to that of the restraining hole 80 and is disposed concentrically to the axial center O. When the screw shaft 24 is screwed and screw-fastened into the screw hole 26, the tapered outer circumferential surface of the restraining portion 82 is taper-fitted to a tapered inner circumferential surface of the restraining hole 80 in surface contact with each other, and the body 12 and the tip 14 are centered and positioned concentrically to the axial center O. In this case, since a portion of the body 12 disposed with the restraining hole 80, i.e., the leading end portion of the cylindrically-shaped coupling portion 34 is elastically deformed to expand in diameter toward the outer circumference due to the taper-fitting of the restraining hole 80 with the restraining portion 82, this allows the screw-fastening between the screw shaft 24 and the screw hole 26 to press the leading end surface 24*f* of the screw shaft 24 against the bottom surface 26*f* of the screw hole 26 in close contact with each other, and the high fastening strength is achieved by frictional engagement between the leading end surface 24*f* and the bottom surface 26*f* as is the case with the example. In this example, the friction due to the surface contact between the restraining hole 80 and the restraining portion 82 also contributes to the fastening strength. The restraining hole 80 and the restraining portion 82 taper-fitted in this way are applicable to the examples of FIGS. 12 to 15.

Although the examples of the present invention have been described in detail with reference to the drawings, these examples are merely an embodiment and the present invention can be implemented in variously modified and improved forms based on the knowledge of those skilled in the art.

NOMENCLATURE OF ELEMENTS

10: indexable thread forming tap 12: body 14, 50, 60, 70: tip 24, 52, 62: screw shaft 24*f*: leading end surface 26: screw hole 26*f*: bottom surface 28: end surface (leading end of the body) 38, 80: restraining hole 40, 82: restraining portion 42: fluid supply path 44: center hole 46: radial holes 72*f*: tapered outer circumferential surface (leading end surface, taper surface) 74: tapered bottom surface (bottom surface, taper surface) O: axial center Dt: rolling cutting diameter (machining diameter) Df: bottom contact surface diameter (outer diameter of the leading end surface) Ds: fastening screw diameter (nominal diameter)

The invention claimed is:

1. An indexable thread forming tap comprising:
a body in a shaft shape; and
a tip concentrically and detachably attached to a leading end portion of the body by screw-fastening and rotationally driven around an axial center along with the body for rolling of a female thread,
the body being disposed with a screw hole concentrically to the axial center such that a screw shaft disposed on the tip concentrically to the axial center is screwed into the screw hole for the screw-fastening,
a leading end surface of the screw shaft being pressed against a bottom surface of the screw hole into close contact with each other by the screw-fastening to integrally fix the tip to the body in a state where a predetermined gap is provided between a leading end of the body and the tip,
the body being disposed with a restraining hole concentrically to the axial center such that a restraining portion disposed on the tip concentrically to the axial center is fitted into the restraining hole to position the body and the tip concentrically to the axial center,
an outer diameter of the leading end surface of the screw shaft brought into close contact with the bottom surface of the screw hole being within a range of 30 to 55% of a machining diameter of the tip, and
a nominal diameter of the screw hole and the screw shaft being within a range of 48 to 66% of a machining diameter of the tip.

2. The indexable thread forming tap of claim 1, wherein a thread of the screw shaft is a reverse buttress thread having a flank angle of a leading flank smaller than a flank angle of a following flank.

3. The indexable thread forming tap of claim 1, wherein the body is disposed with a fluid supply path longitudinally through the axial center to open in the bottom surface of the screw hole, wherein
the tip is disposed with a center hole on the axial center from the leading end surface of the screw shaft and is disposed with a plurality of radial holes from an outer circumferential portion to communicate with the center hole, and wherein
cooling fluid is discharged from the fluid supply path of the body through the center hole and a plurality of the radial holes of the tip to outer circumferential side of the tip.

4. The indexable thread forming tap of claim 1, wherein the leading end surface of the screw shaft has a convex-shaped taper surface concentric to the axial center, wherein the bottom surface of the screw hole has a concave-shaped taper surface concentric to the axial center having a taper angle equal to that of the taper surface of the screw shaft, and wherein the taper surfaces are pressed into surface contact with each other.

\* \* \* \* \*